United States Patent Office 3,172,758
Patented Mar. 9, 1965

3,172,758
OXYGEN PROCESS FOR PRODUCING HIGH
CHROMIUM IRON
Henry L. Jandras, Bethlehem, Pa., assignor, by mesne assignments, to Bethlehem Steel Corporation, a corporation of Delaware
No Drawing. Filed June 27, 1962, Ser. No. 205,548
5 Claims. (Cl. 75—130.5)

This invention relates to a process of manufacturing high chromium irons and steels in general and more particularly to a process wherein the chromium content of the molten bath is protected against substantial loss.

Some of the major metallurgical problems that exist in the production of high chromium and high chromium nickel alloys are due to the great affinity chromium has for oxygen at the temperatures prevalent in the melting furnace. This attraction of chromium for oxygen results in an excessive loss of chromium from the ferrochromium alloy and high chromium stainless steel scrap or other chromium additions by the oxidizing environment of the electric furnace at said temperatures.

The prior solutions to the above problem included the use of special melting techniques resulting in a time consuming operation with its accompanying high labor cost, high electrical power consumption and the required use of high cost raw materials, i.e. selected steel scrap and expensive low carbon ferrochromium alloy.

A conventional method of preparing a high chromium iron or steel consists of charging low phosphorus steel scrap and a required amount of mill scale and/or iron ore along with conventional fluxes, i.e., limestone, fluorspar and sand, into an electric furnace of a familiar type, such as a Heroult, and the charge melted with the electric arc. The oxygen of the mill scale and/or iron ore reacts with the carbon in the steel scrap and removes much of it as gaseous carbon monoxide (CO). The carbon present in the steel scrap is reduced to below the amount specified for the finished product. In some instances the molten bath is injected with gaseous oxygen to decarburize the heat. The original slag is an oxidizing slag necessary to remove impurities such as phosphorus, that exist in the molten metal. After melt-down is completed and the carbon reduced to below the amount specified for the finished product, the heating is discontinued, the current is turned off, as is the flow of gaseous oxygen, and the oxidizing slag is removed from the furnace. Care must be taken to remove all of this oxidizing slag to prevent oxidation of chromium in the ferrochromium alloys and high chromium steel scrap additions. The molten bath is then protected by a reducing or finishing slag of lime, fluorspar and ferrosilicon. The power is then resumed in the furnace and pulverized ferrosilicon alloy is added from time to time to the slag. Since silicon has a great affinity for oxygen, any iron oxide present in the slag is reduced, producing free metallic iron which is dissolved in the molten metal. Any oxygen present in the molten bath is also cleared by the silicon before any ferrochromium additions are made. In this manner, the chromium in the ferrochromium alloy addition is protected from oxidation once it is melted in the bath.

Chromium in the form of a low carbon ferrochromium alloy is now added to the molten bath. Because all ferrochromium alloys contain carbon, it is essential that the alloy addition have a carbon content below that of the molten bath because any carbon now entering the furnace will remain in the bath due to the reducing nature of the furnace environment. After the chromium addition is made, time is allowed for the chromium to diffuse throughout the melt.

Chromium acts as a "drag" on the furnace temperature. Because of this fact all the alloy additions are preheated prior to their addition to the furnace. It is standard practice to "superheat" the metal bath to about 3000° F. before any alloy additions are made to the furnace. This practice is essential because of the high heat absorption accompanying the solution of chromium in the bath and the resultant loss in temperature causing the molten metal to become sluggish.

Because chromium is easily oxidized, is in essence a deoxidizing agent, any moisture entering the furnace with alloying additions is broken down, the oxygen uniting with the chromium and the hydrogen being dissolved in the liquid metal. The solubility of hydrogen is greater in the liquid bath than it is in the solid metal, thus a portion of the hydrogen is rejected upon solidification causing a phenomenon called "flaking" or shatter. All chromium alloys are more or less susceptible to this hazard. For the above reason, all addition agents are preheated to reduce their moisture content to a minimum, thus keeping the amount of hydrogen available at a minimum.

This invention overcomes the above stated complicated solutions by utilizing the fact that at temperatures of 2800° F.–2950° F. normally found in a melting furnace, chromium is oxidized in preference to other elements but at higher temperatures, about 3050° F. the oxidation of chromium can be suppressed to a point whereby substantially all the chromium which has been added to the bath is retained in the bath and the products made therefrom. This result can be realized by injecting a basic iron with gaseous oxygen until the amount of these elements is reduced to a predetermined level and this oxidation of elements increasing the temperature to the required level and protecting the resultant high chromium bath with an appropriate slag.

It is the primary object of the invention to produce a high chromium iron or steel alloy by injecting a stream of gaseous oxygen into molten iron in a ladle without removing the slag covering and effecting thereby a recovery in the final product of 95% of the chromium added thereto as a ferrochromium alloy, high chromium steel scrap or chrome ore.

It is another object of this invention to produce a high chromium iron or steel alloy rapidly, efficiently and economically having the desired analysis of iron and chromium with or without supplementary additions of the well known elements such as tungsten, molybdenum, nickel, copper, vanadium, etc., and the desired ranges of carbon, sulfur, phosphorus, silicon, manganese and the like.

It is another object of this invention to produce a high carbon-high chromium cast iron alloy in an efficient and reliable manner from the use of inexpensive and readily available raw materials and utilizing known and tried equipment.

It is another object of this invention to produce a high chromium iron or steel alloy utilizing the heat from the exothermic chemical reactions proceeding in the ladle during the injection with oxygen as the only source of heat to complete the process.

It is another object of this invention to produce a high chromium iron or steel alloy in which the basic hot metal used is a high silicon cast iron in a single slag process the slag being of a siliceous nature.

It is still another object of the invention to produce a high chromium iron or steel alloy by continuously injecting the molten iron bath with gaseous oxygen and making the necessary alloy additions during the injection with oxygen.

The basic molten bath of iron may be made in any suitable melting apparatus such as a cupola furnace, open hearth furnace, electric furnace, or induction furnace, but preferably in a cupola furnace using the usual charges required to produce an iron high in silicon, having a chemical content of, for example, carbon 0.03% up to about 4.20%, silicon .90% up to about 2.50%, manganese 0.15% up to about 1.00%, phosphorus about 0.15% max., sulfur up to about 0.12% max. and the balance essentially iron. All percentages given herein are by weight.

The above molten high silicon iron is tapped into a basic lined ladle. Limestone and fluorspar in the ratio of one part of lime to three parts of the silica formed by oxidation of the silicon present in the iron, are added to the ladle to flux out impurities and to form an oxidizing slag on top of the molten iron.

The molten metal is then injected with pure gaseous oxygen by inserting a lance through the slag onto the surface of the molten bath. The oxygen combines with the silicon present in the metal to form oxides which are dissolved in the slag, forming a siliceous slag. After the silicon is partially oxidized the carbon reacts with the injected oxygen to form carbon monoxide (CO) which passes off as a gas. The oxidation of the silicon is an exothermic reaction raising the temperature of the bath from about 2650° F./2750° F., the temperature normally present in the melting furnace, to above 3050° F.

The cold additions are then made to the ladle during the injection of the molten metal with oxygen and consist of the following:

(1) Ferrochromium alloy having a chemical composition of, for example, carbon from about 0.02% up to about 6.0%, silicon from about 4.0% up to about 6.0%, chromium from about 62.0% up to about 65.0% and the remainder essentially iron.

(2) High chromium scrap having a chemical composition of, for example, carbon about 1.0%, silicon about 1.5%, chromium about 27.0% and the remainder essentially iron.

(3) Ferrosilicon having a chemical composition of, for example, silicon about 85.0%, the remainder essentially iron.

(4) Limestone and fluorspar.

At the temperatures present in a melting furnace, from about 2650° F. up to about 2750° F., the affinity of oxygen for chromium, carbon and silicon is in the order named. So great is the affinity of oxygen for chromium that practically all chromium present will be oxidized before silicon and carbon will react with the oxygen. This results in a great loss of chromium.

At the temperatures present in the ladle, according to the invention, about 3050° F., the affinity of oxygen for silicon and carbon is much greater than its affinity for chromium, thus the chromium added to the ladle is dissolved in the bath with very little loss. The small amount of chromium which may be oxidized and dissolved in the slag is reduced by silicon in the metal, forming metallic chromium which reverts to the bath. The oxygen injection is continued until white fumes and a short flame develop signifying that silicon has been reduced to under 1.50% and carbon has been reduced to under 1.10% and the bath temperature is at about 3200° F. Ferromanganese alloy is now added to the ladle to bring the manganese content to the required analysis.

The injected oxygen forms a blanket on top of the molten bath between the bath and the siliceous slag. This blanket prevents the absorption of hydrogen, present as moisture in the atmosphere, by the hot liquid bath. The hydrogen which may inadvertently be introduced into the bath as moisture adhering to the cold addition agents, is substantially removed by the oxygen blanket on the molten metal. This exclusion of hydrogen from the iron or steel alloy prevents flaking or shatter.

The protective slag is now removed from atop the molten bath and the bath deoxidized with aluminum. The molten iron is held in the ladle until it has dropped to the pouring temperature of between 2900° F. and 3000° F. An example of a final composition of the high chromium alloy iron comprises carbon about 1.00% up to about 1.50%, manganese about 1.50% up to about 2.00%, phosphorus about 0.10% max., sulfur about 0.08% max., silicon about 1.00% up to about 2.40%, chromium about 25.00% up to about 30.00%, and the remainder essentially iron. A still broader example of a final composition comprises carbon from about 0.03% up to about 2.50%, manganese about 0.75% up to about 2.50%, phosphorus about 0.10% max., sulfur about 0.08% max., nickel about 0.30% up to about 20.00%, silicon about 0.35% up to about 4.00%, chromium about 12.00% up to about 35.00% and the remainder essentially iron.

The above treated iron is then poured into suitable molds and produces a casting which is resistant to high temperatures, for example 1900° F., and displays excellent resistance to abrasion at these high temperatures.

As a specific example of my process, about 1000 pounds of a regular heavy machinery grade grey cast iron high in silicon having a composition of approximately 3.40% total carbon, 1.40% silicon, 0.80% manganese, 0.10% phosphorus, 0.12% sulfur, and the remainder essentially iron, was melted in a cupola furnace and tapped at about 2650° F. into a basic lined ladle. In order to provide a flux for the impurities in the bath and provide a cover for the melt, 50 pounds of limestone and 5 pounds of fluorspar were added to the ladle. The prepared bath was injected by blowing about 800 cubic feet of gaseous oxygen onto the surface of the bath increasing the temperature of the molten metal to above 3050° F. At about this point, while the injection with oxygen was proceeding, 1100 pounds of 65% cold ferrochromium alloy, having a chemical composition of about 0.02% carbon, 6.0% silicon, 64.5% chromium and the remainder essentially iron, 146 pounds of 85% cold ferrosilicon alloy, 1600 pounds of 28% cold chromium scrap, having a chemical composition of about 1.00% carbon, 1.5% silicon, 27.0% chromium and the remainder essentially iron, 122 pounds of limestone and 32 pounds of fluorspar were added to the ladle. The injection of the heat continued until approximately 4300 cubic feet of oxygen had been blown into the heat. At this point white fumes and a short carbon flame developed, signifying that the silicon had been reduced to about 1.50% and the carbon content was about 0.90% up to about 1.10% and the bath temperature was approximately 3215° F. Substantially all of the slag was then removed from the ladle and the molten metal deoxidized by adding 74 pounds of 75% ferromanganese alloy and 3.5 pounds of shot aluminum. A quantity of sand was then added to the ladle to thicken the slight amount of remaining fluid slag, and a refractory brick was placed at the lip of the ladle to act as a skimmer. The metal was held in the ladle until the temperature dropped to 2950° F. and was then poured into the waiting molds and solidified into castings having a chemical composition of about 1.00% carbon, 1.50% manganese, 0.06% phosphorus, 0.06% sulfur, 1.50% silicon, 28.00% chromium, and 0.40% nickel. It was found that 95% of the chromium added to the ladle as ferrochromium and chromium scrap was recovered in the final product.

An additional advantage of the process of the invention is that an economical high carbon ferrochromium alloy addition can be used in processing a high chromium iron utilizing essentially the same process as outlined in my prior specific example. The chemical composition of the high carbon ferrochromium alloy addition was about 6.00% carbon, about 0.40% silicon, about 63.0% chromium and the remainder essentially iron. The final product had a chemical composition of 2.12% carbon, 0.85% manganese, 0.08% phosphorus, 0.03% sulfur, 0.80% silicon, 25.00% chromium, 0.41% nickel, 0.22% molybdenum, and the remainder essentially iron.

Although I have described the process of manufacture in considerable detail, I am aware that alterations and changes may be made without departing from the spirit of the invention and the scope of the claims.

I claim:
1. A method of manufacturing a high chromium iron or steel alloy comprising:
   (a) melting a furnace charge comprising an iron containing carbon and a silicon content of 0.90% min., the balance consisting essentially of iron and elements normally found in irons,
   (b) tapping the molten iron into a basic lined ladle,
   (c) adding fluxing agents to the ladle to form a protective slag atop the molten iron,
   (d) injecting the molten metal in the bath with gaseous oxygen to oxidize the silicon and obtain a bath temperature above 3050° F.
   (e) introducing chromium and ferrosilicon to the molten metal in the ladle while the injection is proceeding, continuing the injection of oxygen until the silicon and carbon in the molten metal have been oxidized to the specified final analysis.
2. A method as claimed in claim 1 in which the fluxing agents in step (c) are limestone and fluorspar added in an amount that will produce a siliceous slag having a ratio of about one part of lime to about three parts of silica during the injection period.
3. A method as claimed in claim 1 in which step (e) includes additions of ferromanganese and the fluxing agents limestone and fluorspar.
4. A method as claimed in claim 1 in which the final composition of the molten metal comprises carbon from about 0.03% up to about 2.50%, manganese from about 0.75% up to about 2.50%, phosphorus about 0.10% max., sulfur about 0.08% max., silicon about 0.35% up to about 4.00%, chromium about 12.00% up to about 35.00% and the remainder essentially iron.
5. A method as claimed in claim 1 in which at least 95% of the chromium added in step (e) is retained in the bath.

References Cited in the file of this patent
UNITED STATES PATENTS

| 2,745,731 | Reese et al. | May 15, 1956 |
| 2,847,301 | Shaw | Aug. 12, 1958 |
| 3,003,865 | Bridges | Oct. 10, 1961 |

FOREIGN PATENTS

| 316,329 | Great Britain | July 29, 1929 |
| 186,982 | Great Britain | Oct. 6, 1922 |